United States Patent [19]

Brown et al.

[11] Patent Number: 4,710,926
[45] Date of Patent: Dec. 1, 1987

[54] FAULT RECOVERY IN A DISTRIBUTED PROCESSING SYSTEM

[75] Inventors: Donald W. Brown, Naperville; James W. Leth, Warrenville; James E. Vandendorpe, Naperville, all of Ill.

[73] Assignee: American Telephone and Telegraph Company, AT&T Bell Laboratories, Murray Hill, N.J.

[21] Appl. No.: 814,115

[22] Filed: Dec. 27, 1985

[51] Int. Cl.$^4$ .............................................. G06F 11/16
[52] U.S. Cl. .......................................... 371/9; 371/11; 371/16
[58] Field of Search .................... 371/9, 11, 10, 14, 15, 371/21, 25, 8; 364/186, 187, 131, 132, 134, 133, 184, 185

[56] References Cited

U.S. PATENT DOCUMENTS

| | | | |
|---|---|---|---|
| 3,828,321 | 8/1974 | Wilber et al. | 340/172.5 |
| 3,991,406 | 11/1976 | Downing et al. | 340/172.5 |
| 4,257,097 | 3/1981 | Moran | 364/200 |
| 4,363,093 | 12/1982 | Davis et al. | 364/200 |
| 4,371,754 | 2/1983 | De et al. | 179/18 |
| 4,412,281 | 10/1983 | Works | 364/200 |
| 4,438,494 | 3/1984 | Budde e al. | 364/200 |
| 4,451,916 | 5/1984 | Casper et al. | 370/16 |
| 4,581,701 | 4/1986 | Hess | 371/9 |
| 4,589,066 | 5/1986 | Lam | 371/9 |
| 4,633,467 | 12/1986 | Abel | 371/11 |
| 4,634,110 | 1/1987 | Julich | 371/9 |
| 4,635,184 | 1/1987 | Schuss | 371/9 |

OTHER PUBLICATIONS

J. F. Wakerly, "Microcomputer Reliability Improvement Using Triple-Modular Redundancy", *Proceedings of the IEEE*, vol. 64, No. 6, Jun. 1976.
W. Guilarte et al., "Maintenance Advantages for a Distributed System", *IEEE*, 1980, pp. 46.5.1–46.5.7.
R. W. Downing, "No. 1 ESS Maintenance Plan", *The Bell System Technical Journal*, vol. XLIII, No. 4, Part 1, pp. 1961–2019, see particularly sections 5.5.1 and 5.6.

*Primary Examiner*—Michael R. Fleming
*Attorney, Agent, or Firm*—Ross T. Watland

[57] ABSTRACT

A fault recovery method for a distributed processing system where a message called a heartbeat is broadcast among the processors once during each major processing cycle. The heartbeat message indicates the physical and logical identity of the transmitting processor with respect to the system arrangement as well as the processor's present operational state. By monitoring the heartbeats from other processors, spare processors can autonomously take over the functions of failed processors without being required to consult or obtain the approval of an executive processor. The new physical location of a replaced processor will be automatically recorded by the other processors. The method has application to duplex standby and resource pool configurations as well as sparing arrangements.

37 Claims, 33 Drawing Figures

SOFTWARE STRUCTURE
OF
CALL CONTROL PROCESSOR 31

| FIG.1 | FIG.2 | FIG.3 |

SOFTWARE STRUCTURE
OF
CALL CONTROL PROCESSOR 31

LMPstatusPMP TABLE

| LMP (INDEX) | PMP | PulseCnt | ActualState |
|---|---|---|---|
| 1 | 425 | 5 | Active |
| 2 | 133 | 5 | StandBy |
| 3 | 722 | 5 | StandBy |
| 4 | 511 | 1 | StandBy |
| 5 | 614 | 4 | Active |
| 6 | 434 | 5 | StandBy |
| 7 | 440 | 5 | StandBy |
| 8 | - | 0 | Unequipped |
| 9 | 115 | 1 | Active |
| 10 | 222 | 5 | Active |
| 11 | - | 0 | Unequipped |
| 12 | 577 | 5 | OutOfService |
| 13 | 812 | 5 | Active |
| 14 | 877 | 5 | StandBy |

FIG. 10

SpareGroup TABLE

| LMP (INDEX) | SpareGroup FOR LMP 5 |
|---|---|
| 1 | FALSE |
| 2 | FALSE |
| 3 | FALSE |
| 4 | FALSE |
| 5 | FALSE |
| 6 | FALSE |
| 7 | FALSE |
| 8 | FALSE |
| 9 | FALSE |
| 10 | FALSE |
| 11 | FALSE |
| 12 | FALSE |
| 13 | FALSE |
| 14 | FALSE |

FIG. 11

SpareGroup TABLE

| LMP (INDEX) | SpareGroup FOR LMP 3 |
|---|---|
| 1 | FALSE |
| 2 | FALSE |
| 3 | FALSE |
| 4 | FALSE |
| 5 | TRUE |
| 6 | FALSE |
| 7 | FALSE |
| 8 | FALSE |
| 9 | TRUE |
| 10 | TRUE |
| 11 | FALSE |
| 12 | FALSE |
| 13 | FALSE |
| 14 | FALSE |

FIG. 12

SpareGroup TABLE

| LMP (INDEX) | SpareGroup FOR LMP 4 |
|---|---|
| 1 | FALSE |
| 2 | FALSE |
| 3 | TRUE |
| 4 | FALSE |
| 5 | FALSE |
| 6 | FALSE |
| 7 | FALSE |
| 8 | FALSE |
| 9 | FALSE |
| 10 | FALSE |
| 11 | FALSE |
| 12 | FALSE |
| 13 | FALSE |
| 14 | FALSE |

FIG. 13

PMPtoFMP TABLE

| PMP (KEY) | FMP |
|---|---|
| 115 | 2 |
| 133 | 2 |
| 222 | 2 |
| 312 | 2 |
| 339 | 1 |
| 425 | 1 |
| 434 | 1 |
| 440 | 1 |
| 511 | 2 |
| 577 | 1 |
| 614 | 2 |
| 722 | 2 |
| 812 | 3 |
| 877 | 3 |

FIG. 14

LMPconfig TABLE

| FMP ($KEY_1$) | RequiredState ($KEY_2$) | LMP ($KEY_3$) |
|---|---|---|
| 1 | Active | 1 |
| 1 | StandBy | 6 |
| 1 | StandBy | 7 |
| 1 | StandBy | 12 |
| 1 | StandBy | 11 |
| 2 | Active | 5 |
| 2 | Active | 9 |
| 2 | Active | 10 |
| 2 | StandBy | 2 |
| 2 | StandBy | 3 |
| 2 | StandBy | 4 |
| 2 | StandBy | 8 |
| 3 | Active | 13 |
| 3 | StandBy | 14 |

FIG. 15

LMPstatusPMP TABLE

| LMP (INDEX) | PMP | PulseCnt | ActualState |
|---|---|---|---|
| • | • | • | • |
| • | • | • | • |
| • | • | • | • |
| 15 | 911 | 5 | Active |
| 16 | 941 | 5 | Active |
| 17 | 991 | 5 | Active |

LMPstatusPMP TABLE

| LMP (INDEX) | PMP | PulseCnt | ActualState |
|---|---|---|---|
| • | • | • | • |
| • | • | • | • |
| • | • | • | • |
| 15 | 911 | 5 | Active |
| 16 | 941 | 0 | OutOfService |
| 17 | 991 | 5 | Active |

FAULT RECOVERY IN A DISTRIBUTED PROCESSING SYSTEM

TECHNICAL FIELD

This invention relates to fault recovery in multiple-processor systems, and more specifically, to recovery mechanisms for such systems where the processors continually monitor heartbeats from the other processors and each processor is capable of taking autonomous recovery action in response to a failure to receive heartbeats, advantageously without the overall guidance of an executive processor.

BACKGROUND OF THE INVENTION

Even though the trend toward distributed processing has been a factor of increasing significance in system design from the initial development of the microprocessor, most current distributed systems employ centralized maintenance and configuration control. A typical system is the distributed signal processing system disclosed in U.S. Pat. No. 4,412,281, issued on Oct. 25, 1983, to G. A. Works. In the Works system, redundant elements comprising signal processors, mass memories and input-output controllers are interconnected by redundant busses. One signal processor element in the system is initially designated as the executive and assigns processing tasks from a mass memory to other elements. When a failure is detected, the executive verifies the failure, isolates the faulty element and reassigns the task to another spare element. If another element is not available, the executive reconfigures the system to permit degraded operation using the available elements. The executive element is fault monitored by one of the other elements which is capable of assuming the role of executive as required. The individual elements are addressed by the executive using a virtual addressing technique for each element.

In such an "executive-controlled" system, the executive processing is very complex because the executive is required to track the operational status of all other elements of the system as well as typically "approving" any software changes to be implemented in the other system elements. In addition, the recovery algorithm implemented by the executive frequently depends in a fixed way on the exact topology of the system. As such, system configuration changes generally result in substantial and time-consuming modifications of the executable recovery code used by the executive.

In view of the foregoing, two recognized problems in the art are the complexity and inflexibility that result when an executive processor controls fault recovery in an otherwise distributed processing system.

SUMMARY OF THE INVENTION

The aforementioned problems are solved and a technical advance is achieved in accordance with the principles of the invention in an illustrative distributed processing system where the responsibility for fault recovery is advantageously distributed among the system processors rather than being controlled by an executive processor, by having each processor continually monitor heartbeat messages broadcast from the other processors and having one processor respond to a failure to receive heartbeat messages from another processor, by autonomously assuming the functions and logical system identity of the failed processor significantly without consulting or obtaining an approval of an executive processor but rather by simply reading local sparing tables defining the sparing relationships among the various system processors. All processors are automatically notified of the change when the processor assumes its new logical identity and begins broadcasting heartbeat messages defining such new identity.

An illustrative fault recovery method in accordance with the invention is used in an exemplary distributed processing arrangement including a number of processors each having a logical identity defining the functions performed by that processor with respect to the arrangement. According to the method, each processor repeatedly broadcasts heartbeat messages to other processors. Each such heartbeat message defines the logical identity of the processor broadcasting the heartbeat message. At least one of the processors maintains a status table defining the logical identities of other processors based on received heartbeat messages. Upon failing to receive heartbeat messages defining one of the logical identities defined in the status table, the at least one processor assumes such logical identity for performing the functions of a processor having that logical identity.

Each of the processors also has an associated sparing table defining the logical identities that the processor can assume. A processor assumes the logical identity of another processor only after reading the sparing table and determining that such assumption of logical identity is allowed.

The exemplary distributed processing arrangement also includes a database processor. In order for one processor to assume the logical identity of another processor, communication with the database processor must be effected and the information defining the functions of the other processor must be downloaded by the database processor.

In addition to defining logical identity, the heartbeat messages also define the physical identity and present processor state of the processor broadcasting the heartbeat message. A processor assuming a new logical identity repeatedly broadcasts heartbeat messages defining both its unchanged physical identity and the assumed logical identity to other processors. Thus the other processors are automatically informed of the change of logical identity.

The fault recovery method of the present invention is applicable when two of the processors operate in a duplex standby mode of operation.

The invention is further applicable in an arrangement comprising a resource pool of processors and at least one other processor that needs to select a processor from the resource pool. Each of the pool of processors repeatedly transmits heartbeat messages to the other processor. The heartbeat messages each define the present processor state of the processor transmitting the heartbeat message. The other processor maintains a status table based on the received heartbeat messages defining the present processor state of each processor in the pool. The other processor makes its selection of a processor from the resource pool based on the processor state defined by the status table. In particular, the other processor selects a processor that is defined by the status table as being in an active processor state. When a given processor of the resource pool terminates the transmission of heartbeat messages, the other processor changes its status table to define the present state of the given processor as being out-of-service.

In an alternative embodiment of the invention, the processors can have multiple logical identities. Accordingly, a given processor can maintain its original logical identity and perform its original functions and assume in addition the functions and logical identity of a failed processor.

BRIEF DESCRIPTION OF THE DRAWING

A more complete understanding of the invention may be obtained from a consideration of the following description when read in conjunction with the drawing in which:

FIGS. 10 through 15 are various tables important in implementing the fault recovery mechanism of the present invention;

DETAILED DESCRIPTION

Figure 1:
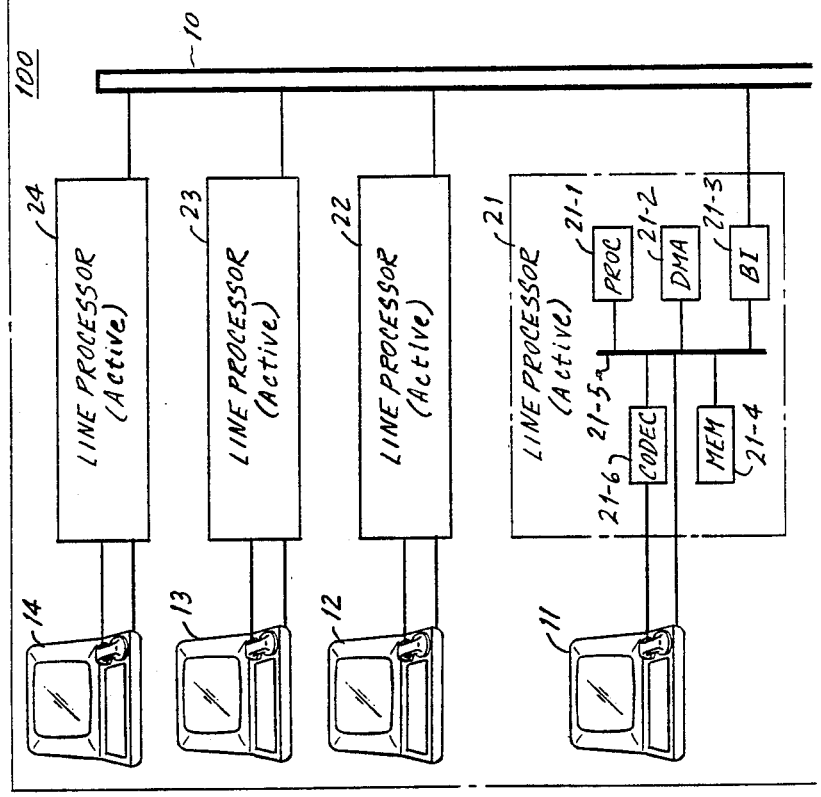
FIGS. 1 through 3, when arranged in accordance with FIG. 4, present a block diagram of an exemplary distributed processing arrangement used to illustrate the fault recovery method of the present invention.
Figure 2:
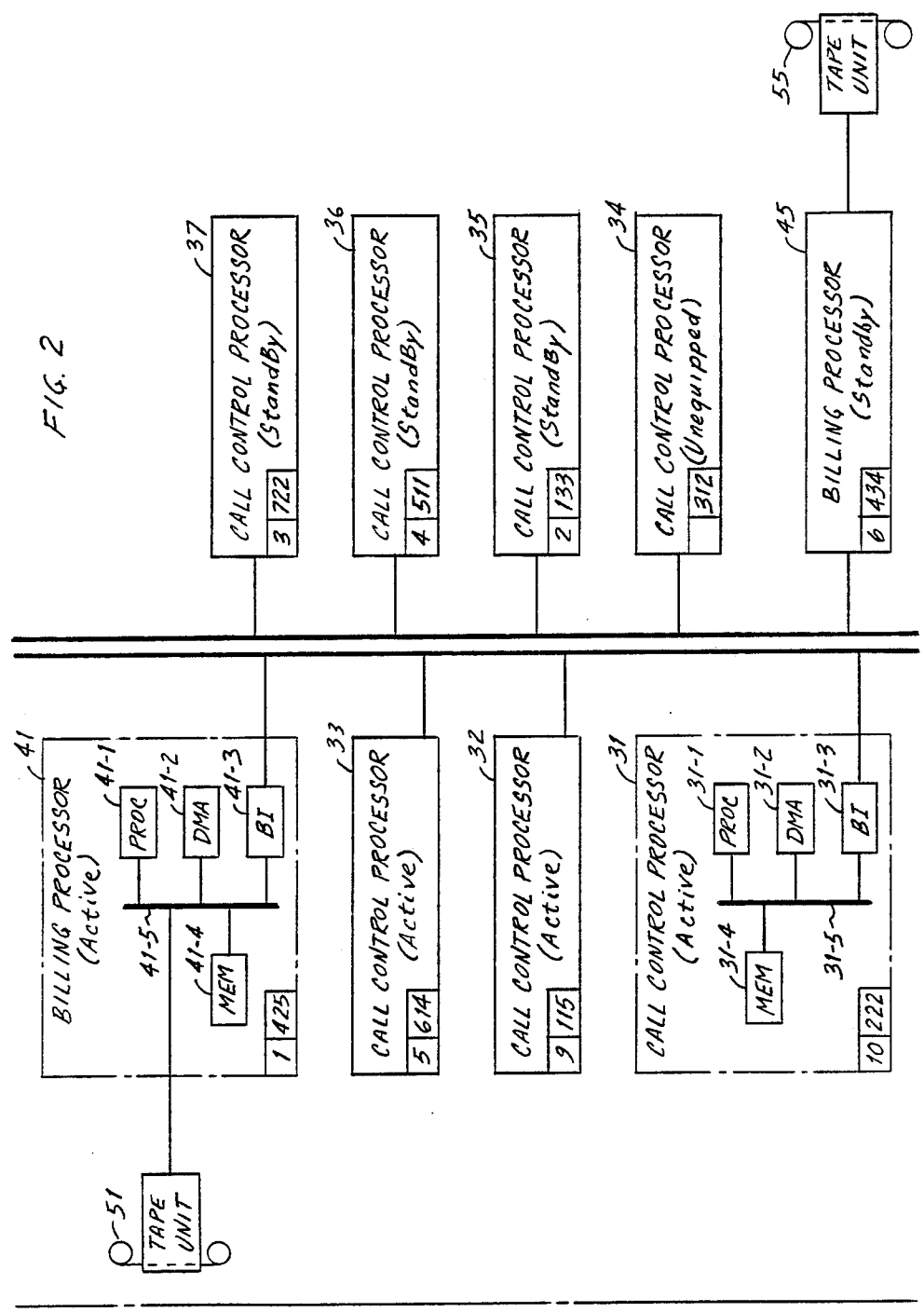
Figure 3:
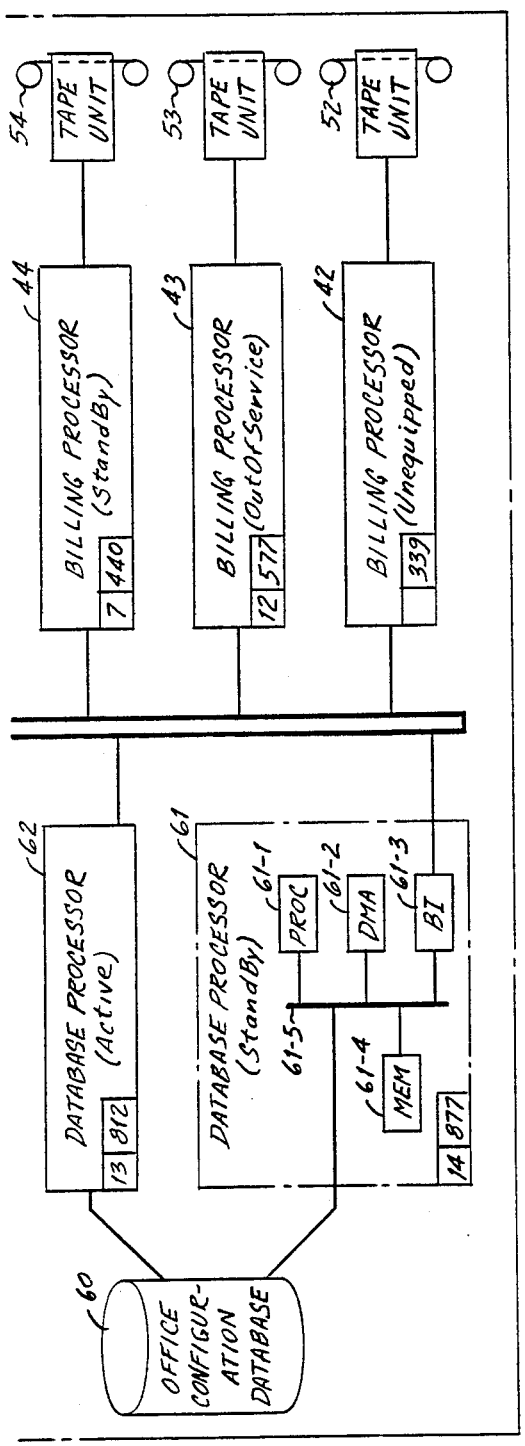
Figure 4:
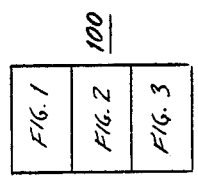

FIGS. 1 through 3, arranged in accordance with FIG. 4, present a block diagram of an exemplary distributed processing arrangement 100 in accordance with the invention. Arrangement 100 illustratively comprises a distributed control switching system and includes a plurality of processor modules, referred to herein simply as processors. The processors are interconnected by a processor interconnect mechanism 10, illustratively a CSMA/CD bus, such as the Ethernet ® bus, capable of both selective and broadcast transmission of packets to the other processors connected thereto. Four types of processors are shown in the exemplary arrangement 100 as being interconnected by bus 10: (1) line processors such as processors 21 through 24 serving corresponding user teleterminals 11 through 14 (although such line processors could also each serve a multiplicity of user teleterminals), (2) call control processors such as processors 31 through 37 used to direct the various phases of call processing in a switching system, (3) billing processors such as processors 41 through 45 each connected to an associated tape device 51 through 55 used for the storage of billing information related to telephone calls in a switching system, and (4) database processors such as processors 61 and 62 both connected to an office configuration database 60, illustratively, a disc. Database processors 61 and 62 are used by the various other processors of arrangement 100 to obtain programs and data from database 60 to define the various processor functions required in a distributed control switching system.

Bus 10 is used both to convey the packetized voice and data between the user teleterminals, e.g. 11 through 14, and also to convey the inter-processor control messages required to control calls. For example, if line processor 21 detects a service request and receives a destination address or directory number for a call from user teleterminal 11, a number of control messages are exchanged between line processor 21 and ones of the call control processors 31, 32, and 33 to translate the directory number to determine the desired destination and to conduct various call-related activities concerning the originating end of the call. Further control messages are then conveyed between ones of the call control processors 31, 32 and 33 and line processor 24 to establish the terminating portion of the call if the determined destination is user teleterminal 14. Such activities include the assignment of a logical channel, for example, to be used to convey packetized voice for the call and storing the appropriate physical to logical translations required by the originating and terminating line processors to establish a virtual circuit. In addition, message communication is required with billing processor 41 to establish the necessary call records in order to properly bill the call. Further message communication is required at call termination.

Each processor of arrangement 100 has a physical identity (PMP) defining the physical location and identification of the processor with respect to arrangement 100. Each processor also has a logical identity (LMP) defining the logical function to be performed by that processor with respect to arrangement 100. The LMP and PMP for various processors of a representative processor configuration are shown in FIGS. 2 and 3 in the lower left corner of the processors. For example, billing processor 41 is indicated to have a logical identity (LMP) of 1 and a physical identity (PMP) of 425. Although not shown in FIG. 1, line processors 21 through 24 also have associated logical and physical identities for communicating with the other processors of arrangement 100.

Figure 5:
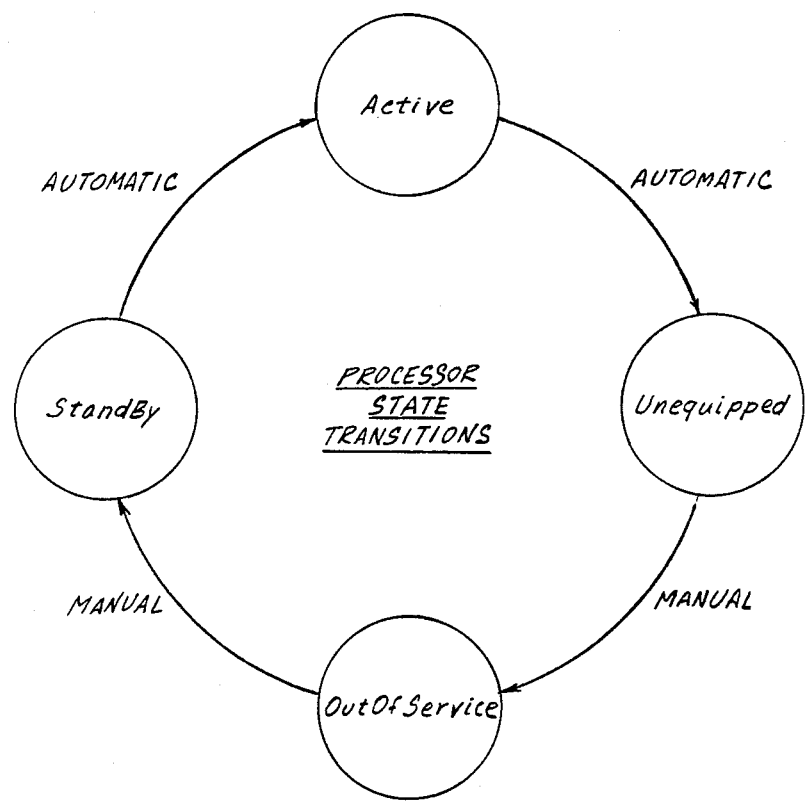
FIG. 5 is a state diagram showing the four possible processor states for the processors in the arrangement of FIGS. 1 through 3 and the transitions between states.

Each processor of arrangement 100 is in one of four possible states: (1) active, indicating that the processor is running application programs, (2) standby, indicating that the processor is ready to replace a failed active processor, (3) out-of-service, indicating that the processor is available for maintenance or diagnostics, and (4) unequipped indicating that the processor has been halted or physically disconnected. Processor state transitions are cyclic. Changes from one state to another are either automatic, as a consequence of a hardware failure, or manual. The state transition diagram shown in FIG. 5 illustrates how the changes occur.

In the exemplary arrangement 100, the line processors 21 through 24 are all in the active state and each forms a distinct failure group because the required individual circuits and connections to the user teleterminals are expensive and are therefore not duplicated. Line processor 21 comprises a processor 21-1, e.g. the Motorola 68000 processor, and associated memory 21-4 (including, for example, both random access memory (RAM) and read only memory (ROM) as required). A direct memory access (DMA) unit 21-2 is included as a means of conveniently reading memory 21-4. Line processor 21 further includes a codec 21-6 which converts information from the analog speech format presented from the handset of user teleterminal 11 to the conventional 64 kilobits per second PCM speech representation. Such encoded speech information, as well as digital information received directly from the keyboard or switchhook of user teleterminal 11, is transmitted to bus 10, by the cooperation of processor 21-1 and memory 21-4, in the form of packets via a bus interface 21-3 (of conventional design for interfacing bus 10). The various units comprising line processor 21 are interconnected by an internal bus 21-5 in a conventional manner. Packets received from bus 10 including headers defining that the packets are to be received by processor 21, are transmitted via bus interface 21-3 for storage by memory 21-4. Such packets are further processed and transmitted either as encoded 64 kilobits per second speech samples to codec 21-6, for subsequent transmission in analog form to the handset of user teleterminal 11, or as digital information for display by user teleterminal 11 or to control other elements, e.g., a ringer, of user teleterminal 11. Each of the other line processors 22 through 24 is of similar construction. (Of course, if the user teleterminals are equipped to directly handle speech in the digital, 64 kilobits per second PCM format, the codecs, such as codec 21-6 in line processor 21, are not required.)

Of the seven call control processors 31 through 37 included in arrangement 100, three, 31 through 33, are in the active state; three, 35 through 37, are in the standby state; and one, 34, is in the unequipped state. Each call control processor has the same general architecture as line processor 21 except that the connections and elements needed in line processor 21 to interface with user teleterminal 11 are not required in the call control processors. Call control processor 31, for example, includes processor 31-1, memory 31-4, DMA 31-2, bus interface 31-3, and internal bus 31-5.

Of the five billing processors 41 through 45 included in arrangement 100, one, 41, is in the active state; two, 44 and 45, are in the standby state; one, 43, is in the out-of-service state, and one, 42, is in the unequipped state. Each billing processor is similar in construction to the line and call control processors except that a billing processor must be interfaced with its associated tape unit. Billing processor 41, for example, includes processor 41-1, memory 41-4, DMA 41-2, bus interface 41-3, and internal bus 41-5, and is interfaced to associated tape unit 51. Billing processors 42 through 45 have associated tape units 52 through 55.

Of the two database processors 61 and 62, processor 62 is in the active state and processor 61 is in the standby state. The database processors are similar in construction to the processors of other types already described except that both database processors 61 and 62 are connected to the same office configuration database 60. Database processor 61, for example, includes processor 61-1, memory 61-4, DMA 61-2, bus interface 61-3, and internal bus 61-5, and is interfaced to the office configuration database 60. (For reliability reasons, it may be desirable to duplicate database 60 and provide access from each of the database processors 61 and 62 to the duplicate database.)

The software structure of each of the types of processors comprising arrangement 100 consists of a plurality of software modules, e.g., program processes or software objects, that communicate with each other via control messages. A program process comprises a collection of procedures, each performing some subtask of the process. Associated with a process is a block of memory called a process control block which stores data applicable to the entire process, and a block of memory called a stack which stores data useful to the individual procedures of the process. A software object is an instance of an abstract data type comprising an aggregate of logically related data and functions. The present invention is independent of the implementation technique used for the software modules.

Figure 6:
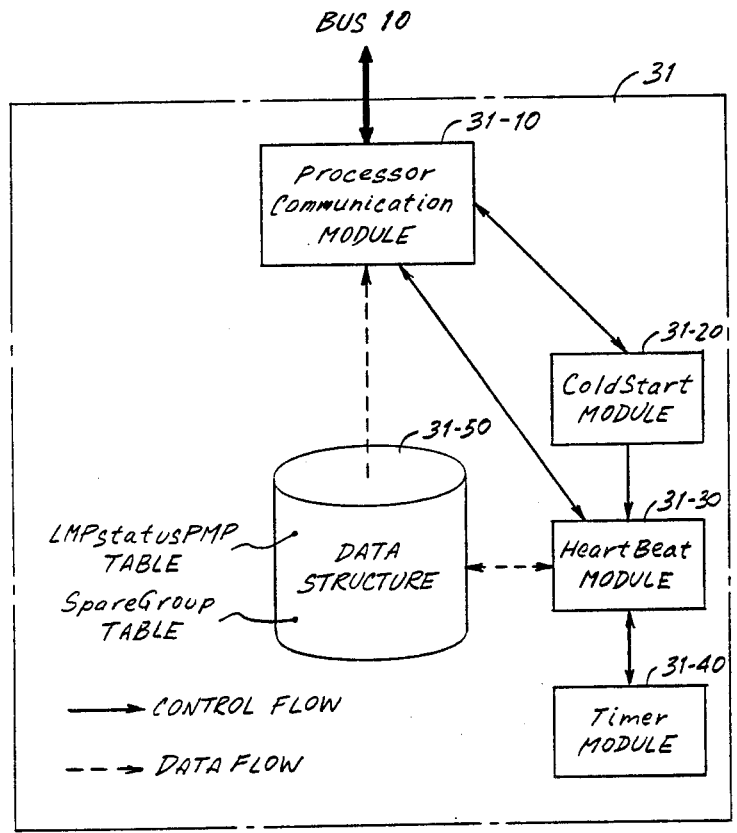
FIG. 6 illustrates the software structure of a call control processor included in the arrangement of FIGS. 1 through 3.

Typical of the software structure of the various processors is that shown in FIG. 6 for call control processor 31. A processor communication module 31-10 includes the programs necessary for the other software modules of processor 31 to convey information to and from bus 10 for either broadcast or selective communication with other processors. Processor communication module 31-10 is the only software module that addresses other processors using their physical identity (PMP) rather than their logical identity (LMP). Processor 31 further includes a cold start module 31-20 used for the initialization of processor 31 and further includes a heartbeat module 31-30 which includes the programs necessary for generating and responding to heartbeat messages conveyed among the processors of arrangement 100 in accordance with the invention. A timer module 31-40 is used to control the periodic activities such as heartbeat generation and checking within heartbeat module 31-30. Processor communication module 31-10 and heartbeat module 31-30 both have access to data stored in a data structure 31-50. Such data includes data tables referred to herein as an LMPstatusPMP table and a SpareGroup table. Examples of such tables are shown in FIGS. 10 through 13, and descriptions of their use in accordance with the invention are included herein. The software modules shown in FIG. 6 for call control processor 31 are only the basic modules required for processor operation. Other application-dependent modules required for call control processor 31 to perform its specific functions as part of a distributed control switching system are not shown in FIG. 6.

Figure 7:
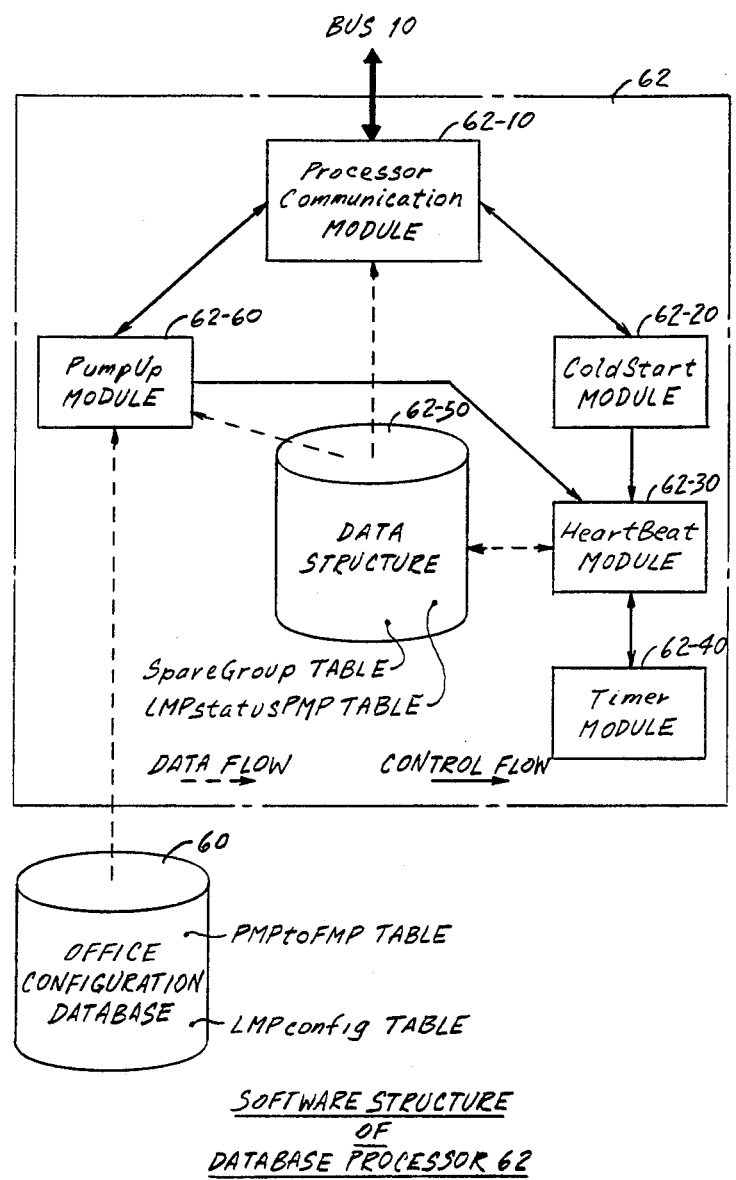
FIG. 7 illustrates the software structure of a database processor included in the arrangement of FIGS. 1 through 3.

The basic software modules shown in FIG. 6 for call control processor 31 are typical of the software modules included in the line processors, e.g., 21, the billing processors, e.g., processor 41, as well as the database processors, e.g., processor 62. However, as shown in FIG. 7, database processor 62 further includes in addition to the corresponding modules 62-10, 62-20, 62-30, 62-40 and data structure 62-50, a pump up module 62-60 which accesses the data of office configuration database 60 to among other things pump up or download other processors with the programs required to perform specific functions. Pump up module 62-60 also accesses a FMPtoPMP table (FIG. 14) and a LMPconfig table (FIG. 15) stored in database 60 and used in accordance with the invention in a manner described herein.

SPARING ARRANGEMENT

Central to the present invention, each processor in arrangement 100 periodically, e.g., at 0.2 second intervals, broadcasts a heartbeat message on bus 10. The heartbeat message defines the physical identity (PMP), logical identity (LMP), and processor state (active, standby or out-of-service) of the transmitting processor. Each processor receives each heartbeat message transmitted by the other processors and uses the information contained therein to update its LMPstatusPMP table (FIG. 10) by modifying the appropriate LMP, PMP, or Actual State entries in the table as well as to reset a "leaky bucket" counter. In the present example, the "leaky bucket" counter is represented by the Pulse Count entry in the LMPstatusPMP table and the Pulse Count entry is reset to five when a heartbeat message is received. The Pulse Count entry in the LMPstatusPMP table is decremented at regular intervals. When a processor either fails or for some other reason chooses to stop the transmission of its heartbeat messages, the Pulse Count entry in the LMPstatusPMP tables of all other processors is, over time, decremented to zero. In response to the Pulse Count entry being reduced to zero, each of the other processors accesses its SpareGroup table to determine whether that processor is defined as a spare processor for the failed processor. If the SpareGroup table of a given processor defines that it is a spare processor for the failed processor, the given processor assumes the logical identity of the failed processor in a manner described in detail herein.

Consider as an example, that call control processors 31, 32, and 33 of arrangement 100 are in the active state. The SpareGroup tables for each of the processors 31 through 33 define as in FIG. 11 that those processors are not defined as spare processors for any other processor. Additionally assume that call control processor 37, which is in the standby state, is designated as the primary spare call control processor. This designation as the primary spare is reflected in the SpareGroup table (FIG. 12) stored by call control processor 37 (LMP 3) where call control processor 37 is designated as a spare processor for call control processor 31 (LMP 10), a call control processor 32 (LMP 9), as well as call control processor 33 (LMP 5). Finally assume that call control processor 36, which is also in the standby state, is designated as the secondary spare call control processor. This designation is reflected in the SpareGroup table (FIG. 13) stored by call control processor 36 (LMP 4) in that call control processor 36 is defined in that table as the spare for only the primary spare call control processor 37 (LMP 3) and no other processors.

Continuing the example, assume that call control processor 31 (LMP 10) fails and subsequently discontinues its periodic transmission of heartbeat messages on bus 10. The Pulse Count entry in the LMPstatusPMP tables of each of the processors in arrangement 100 subsequently is reduced to zero. However, only the primary spare call control processor 37 determines by reading its SpareGroup table that it is in the designated spare processor for the failed processor 31. Accordingly processor 37 assumes the logical identity of the failed processor 31.

Figure 8:
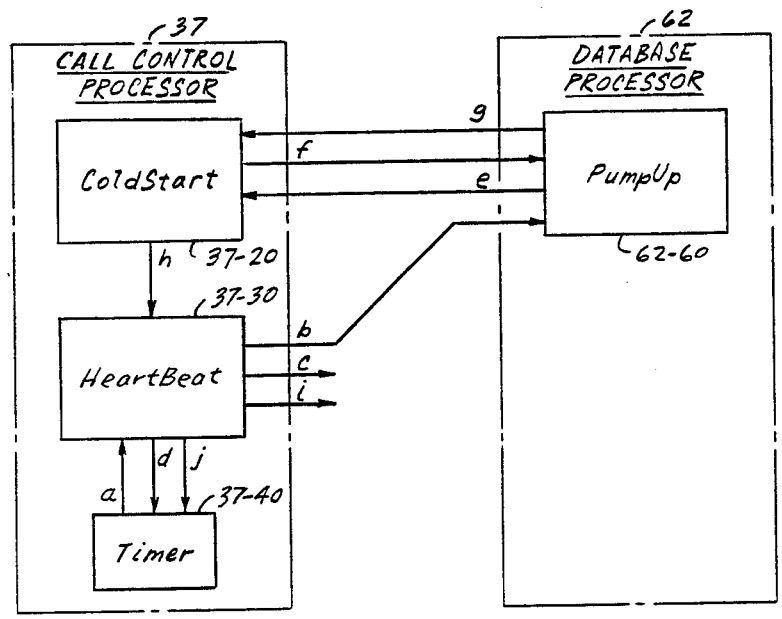
FIG. 8 is a message sequence diagram defining the messages that are transmitted between a database processor and a standby call control processor in the arrangement of FIGS. 1 through 3 during the process of the standby call control processor assuming the role of a failed active call control processor.

The control messages required between the various software modules of call control processor 37 and database processor 62 in order that processor 37 can assume the functions of the failed processor 31 are denoted in FIG. 8 by the characters a through j. The control message (a) represents the final pulse decrementing the PULSE COUNT entry in the LMPstatusPMP table of processor 37 to zero thereby triggering the reading of the SpareGroup table and the determination that processor 37 is to assume the logical identity of processor 31. Heartbeat module 37-30 transmits a PumpUp.RestoreLMP message (b), also referred to herein as a download request message, to the pump up module 62-60 in database processor 62 indicating that processor 37 is to be downloaded with the base programs for processor 31. Heartbeat module 37-30 also continues to broadcast its HeartBeat.Pulse message (c) defining its logical identity as LMP 3. Hearbeat module 37-30 further transmits a message (d) to timer module 37-40 to reset the timer. In response to the PumpUp.RestoreLMP message (b), pump up module 62-60 in database processor 62 transmits a ColdStart.RestoreLMP (S-record) message (e) to cold start module 37-20 in call control processor 37. The S-record is a standard unit of downloaded information comprising both program text and data. Of course, in the present example, the downloaded information comprises the programs and the initial data required to perform the functions previously preformed by the failed call control processor 31. Upon the successful receipt of an S-record, cold start module 37-20 returns an acknowledgment message (f) to pump up module 62-60. The process of downloading S-records and subsequently acknowledging their receipt by cold start module 37-20 continues until all the program text and data required by call control processor 37 to function as processor 31 has been transferred.

Once the downloading is complete, pump up module 62-60 transmits a ColdStart.ChangeIdentity message (g) to cold start module 37-20. The ColdStart.Change Identity message includes information defining the new logical identity LMP 10, the required active state of processor 37, and the SpareGroup table for LMP 10 which defines that processor 37 is not a spare for any other processor. In response to the ColdStart.ChangeIdentity message, cold start module 37-20 transmits a HeartBeat.Start message (h) to heartbeat module 37-30 defining the new logical identity LMP 10, the unchanged physical identity PMP 722, as well as the required active state of processor 37. In response to the HeartBeat.Start message, heartbeat module 37-30 broadcasts (via the processor communication module) a heartbeat message (i) defining the new logical identity LMP 10 of call control processor 37 to the other processors. Heartbeat module 37-30 then transmits a reset message (j) to timer module 37-40 and timer module 37-40 begins timing another cycle.

Recall that call control processor 36 was designated as the secondary spare call control processor 36 in arrangement 100. Since call control processor 37 is now transmitting heartbeat messages defining LMP 10 rather than LMP 3, the Pulse Count entry for LMP 3 in the LMPstatusPMP table of processor 36 will be decremented to zero. Processor 36 will therefore read its SpareGroup table and will determine that it is designated as the spare processor for LMP 3. This determination will trigger a sequence of events similar to that just described in order that processor 36 can assume the logical identity LMP 3 as the new primary spare call control processor. Note that the downloading of S-records may be substantially reduced compared to the previous scenario, since processor 36 will only be functioning as a spare processor whereas processor 37 assumed the role of an active processor. If call control processor 35 was designated as a tertiary spare, the process would repeat again as processor 35 assumed the new logical identity LMP 4.

In the present example, the same sparing strategy is used for the billing processors. Billing processor 41 is designated as the active billing processor with processors 45 and 44 designated as the primary and secondary spares, respectively.

DUPLEX STANDBY OPERATION

The database processors 61 and 62 on the other hand operate in a duplex standby mode with processor 62 designated as the active database processor but with processor 61 ready to become the active processor whenever needed. Processor 61 already has stored therein the program text and data necessary to function as an active database processor. In duplex standby operation, processor 61 monitors all messages received by processor 62 and reproduces the computations of processor 62. Assume that active database processor 62 fails and it terminates the transmission of heartbeat messages. The standby database processor 61 will detect this condition (by having the Pulse Count entry for LMP 13 in its LMPstatusPMP table go to zero) and will subsequently assume the role of the active database processor, i.e., by assuming the logical identity LMP 13. The other processors of arrangement 100 will receive heartbeat messages from the now active database processor 61 and will record the new logical identity (LMP 13) and the active status in their LMPstatusPMP table entries for processor 61 (PMP 877).

ADDING A NEW PROCESSOR

Figure 9:
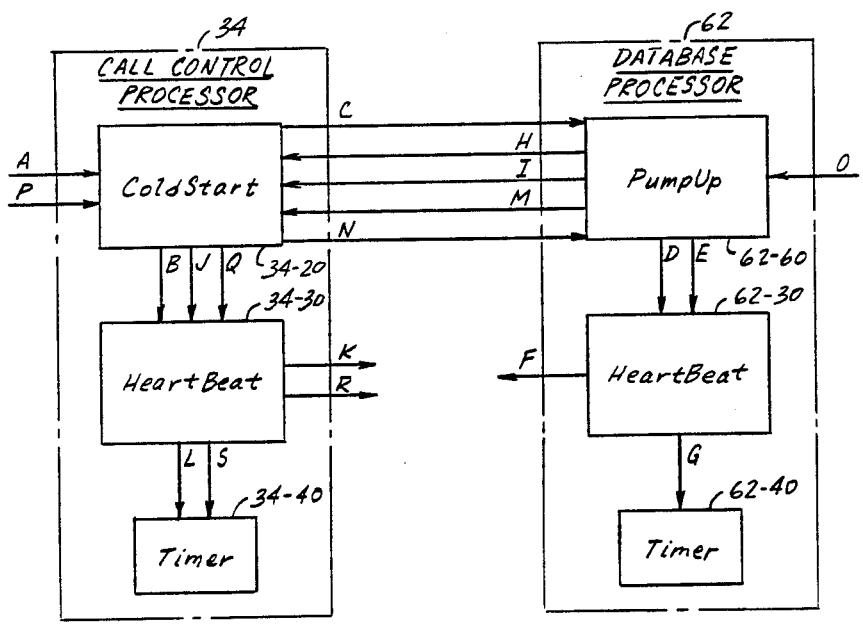
FIG. 9 is a message sequence diagram defining the messages that are transmitted between a database processor and a previously unequipped call control processor in the arrangement of FIGS. 1 through 3 during the process of equipping the call control processor for service as a standby processor.

As a continuation of the previous example concerning the call control processors, assume that because of the failure of call control processor 31, it now becomes necessary for reliability reasons to add or "equip" call control processor 34 to become operational in arrangement 100. The scenario required to equip processor 34 is shown in FIG. 9 with the messages or actions relating to the software modules of call control processor 34 and database processor 62 (again assumed to be the active database processor) denoted by the letters A through S. First, the hardware reset button of processor 34 is manually pressed (A) and an interrupt-driven, ColdStart.Initialize procedure is invoked. Cold start module 34-20 transmits a message (B) to heartbeak module 34-30, which responds by invoking its HeartBeat.Initialize routine enabling the reception of HeartBeat.Pulse messages from other processors. The periodic broadcast of heartbeat messages from processor 34 is not yet enabled. Cold start module 34-20 then broadcasts a PumpUp.ColdStart message (C) defining the physical identity of processor 34, PMP 312. Although the message is broadcast, only pump up module 62-60 accepts the message, which uses the PMPtoFMP (FIG. 14) and LMPconfig (FIG. 15) tables stored in office configuration database 60 to detemine the logical identity or LMP that call control processor 34 is to assume. The replaceable processors of arrangement 100 are classified in families representing hardware equivalence classes of processors. In arrangement 100, the billing processors are in family FMP 1, the call control processors are in family FMP 2, the database processors are in family FMP 3, and the line processors are in family FMP 4. Pump up module 62-60 determines based on the PMP 312 of processor 34, that the PMPtoFMP table (FIG. 14) defines processor 34 to be in family FMP 2, the family of call control processors. Then using the LMPstatusPMP table (FIG. 10) and the LMPconfig table (FIG. 15), LMP 8 is selected as the next unequipped processor in family FMP 2. Pump up module 62-60 then transmits a message (D) to heartbeat module 62-30 which is a local HeartBeat.Pulse message defining LMP 8, PMP 312, and out-of-service as the initial state of processor 34. This allows heartbeat module 62-30 to complete the appropriate entries for the new processor in its LMPstatusPMP table. Pump up module 62-60 then transmits a HeartBeat.Start message (E) to heartbeat module 62-30 defining the LMP 13, PMP 812, and active state of database processor 62. This results in the broadcast of the HeartBeat.PulseMessage (F) to all other processors defining the LMP, PMP, and present processor state of database processor 62. Processor 34 receives the HeartBeat.PulseMessage and includes entries appropriately defining database processor 62 in its LMPstatusPMP table which allows processor 34 to communicate with processor 62. Heartbeat module 62-30 transmits a message (G) to timer module 62-40 such that database processor 62 continues to periodically broadcast its heartbeat messages. Pump up module 62-60 transmits a ColdStart.IdentifyOCD message (H) to cold start module 34-20 defining LMP 13, the logical identity of active database processor 62. Pump up module 62-60 then transmits a ColdStart.ChangeIdentity message (I) to cold start module 34-20 defining LMP 8, the out-of-service state, and the appropriate Spare-Group table. In response, cold start module 34-20 transmits a message (J) to heartbeat module 34-30 to invoke its HeartBeat.Start routine to initiate the transmission of heartbeat messages by processor 34 defining LMP 8, PMP 312, and the out-of-service state. Message (K) in FIG. 9 represents the first such heartbeat message. Heartbeat module 34-30 then transmits a reset message (L) to timer module 34-40 such that the timer will periodically trigger the transmission of heartbeat messages. Pump up module 62-60 then transmits a ColdStart.Restore message (M) to cold start module 34-20 including an S-record comprising program text or data required by processor 34 to operate as a spare call control processor. Cold start module 34-20 returns an acknowledgement message (N) to pump up module 62-60 upon the successful receipt of the S-record. The messages (M) and (N) continue to be exchanged until all the necessary program text and data has been downloaded to processor 34. The letter (O) in FIG. 9 indicates that a craftsperson may interact through a craft interface processor (not shown) and monitor diagnostic messages during routine testing of processor 34. Assume for the purposes of this example, that processor 34 passes all diagnostic tests and is to be placed in the standby state. The craft interface processor then transmits a ColdStart.ChangeIdentity message (P) to cold start module 34-20 defining LMP 8, the new standby state, and the SpareGroup table appropriate for processor 34. In response, processor 34 changes from the out-of-service state to the standby state. Cold start module 34-20 then transmits a local HeartBeat.Start message (Q) to heartbeat module 34-30 such that the appropriate entries can be made in the LMPstatusPMP table. Heartbeat module 34-30 then broadcasts its first new heartbeat message (R) informing the other processors of its readiness to serve as a standby call control processor. Heartbeat module 34-30 then transmits a reset message (S) to timer module 34-40 such that the heartbeat messages are triggered at the appropriate periodic intervals.

RESOURCE POOLS

Figures 16, 17, 18:
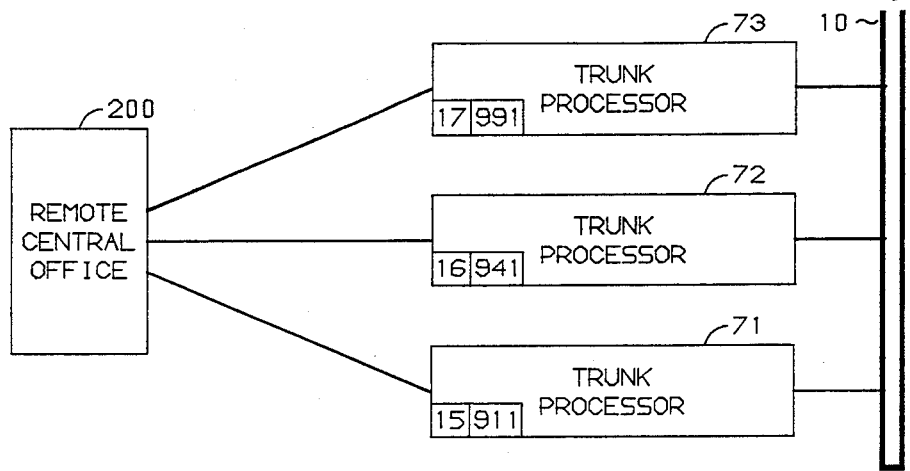
FIG. 16 is a block diagram representing an addition to the arrangement of FIGS. 1 through 3 comprising a resource pool of trunk processors connected to a remote central office.
FIGS. 17 and 18 are tables related to the resource pool of FIG. 16.

FIG. 16 shows an addition to arrangement 100 comprising three trunk processors 71, 72, and 73 each connecting one or more trunks from a remote central office 200 to bus 10 of arrangement 100. Trunk processors 71, 72, and 73 form a resource pool since any one of them offers equivalent services to the other processors such as call control processor 32. For example, if during the progress of a call, call control processor 32 determines that the call is to be completed to remote central office 200, processor 32 can select any one of the trunk processors 71, 72 or 73 to establish the connection. As with the other processors of arangement 100, the trunk processors each broadcast heartbeat messages on bus 10 defining the LMP, PMP and actual processor state. A separate entry for each of the trunk processors 71, 72 and 73 is maintained in all LMPstatusPMP tables based on the received heartbeat messages. For example, a portion of the LMPstatusPMP table stored by call control processor 32 is shown in FIG. 17. Whenever call control processor 32 needs to complete a call to remote central office 200, it selects one of the three LMPs 15, 16, or 17 and communicates with the trunk processor having the selected LMP to complete the call. As with the other processors of arrangement 100, when trunk processor 72, for example, fails, it terminates the transmission of its heartbeat messages. Each of the other processors of arrangement 100 detects such termination and when the Pulse Count entry in the LMPstatusPMP table is reduced to zero, the trunk processor 72 (having LMP 16 and PMP 941) is considered out-of service as shown in FIG. 18. Thereafter call control processor 32 will select one of the trunk processors 71 or 73 to complete calls to remote central office 200.

The programs comprising the processor communication, cold start, heartbeat, and pump up modules are written, for example, in the well-known "C" programming language. Flow charts describing the various functions performed by the modules are shown in FIGS. 19 through 33.

Figure 19:
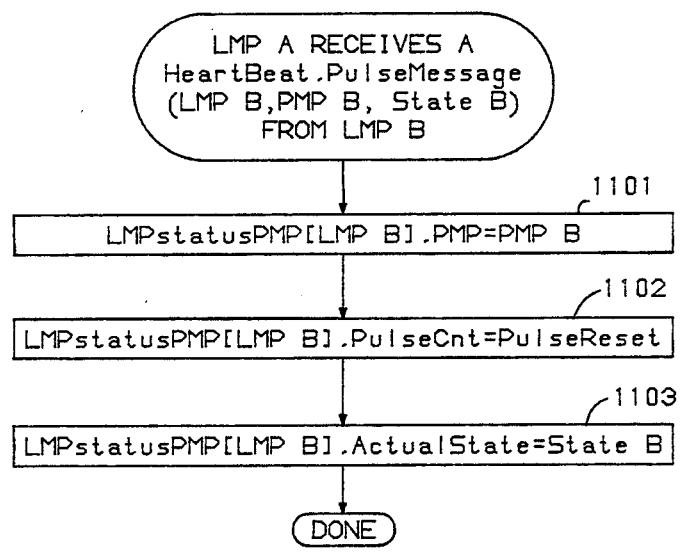
FIGS. 19 through 33 are flow charts defining the programs of various software modules shown in FIGS. 6 and 7.

The flow chart of FIG. 19 describes the response of the heartbeat module in processor LMP A to the receipt of a Heartbeat.PulseMessage (LMP B, PMP B, State B) from processor LMP B. During the blocks 1101, 1102, and 1103, the LMPstatusPMP table entries for LMP B are set as follows: (1) the PMP entry for LMP B is set equal to PMP B in accordance with the message, (2) the Pulse Count entry for LMP B is set to the reset value, e.g., five, and (3) the Actual State entry for LMP B is set to State B in accordance with the message.

Figure 20:
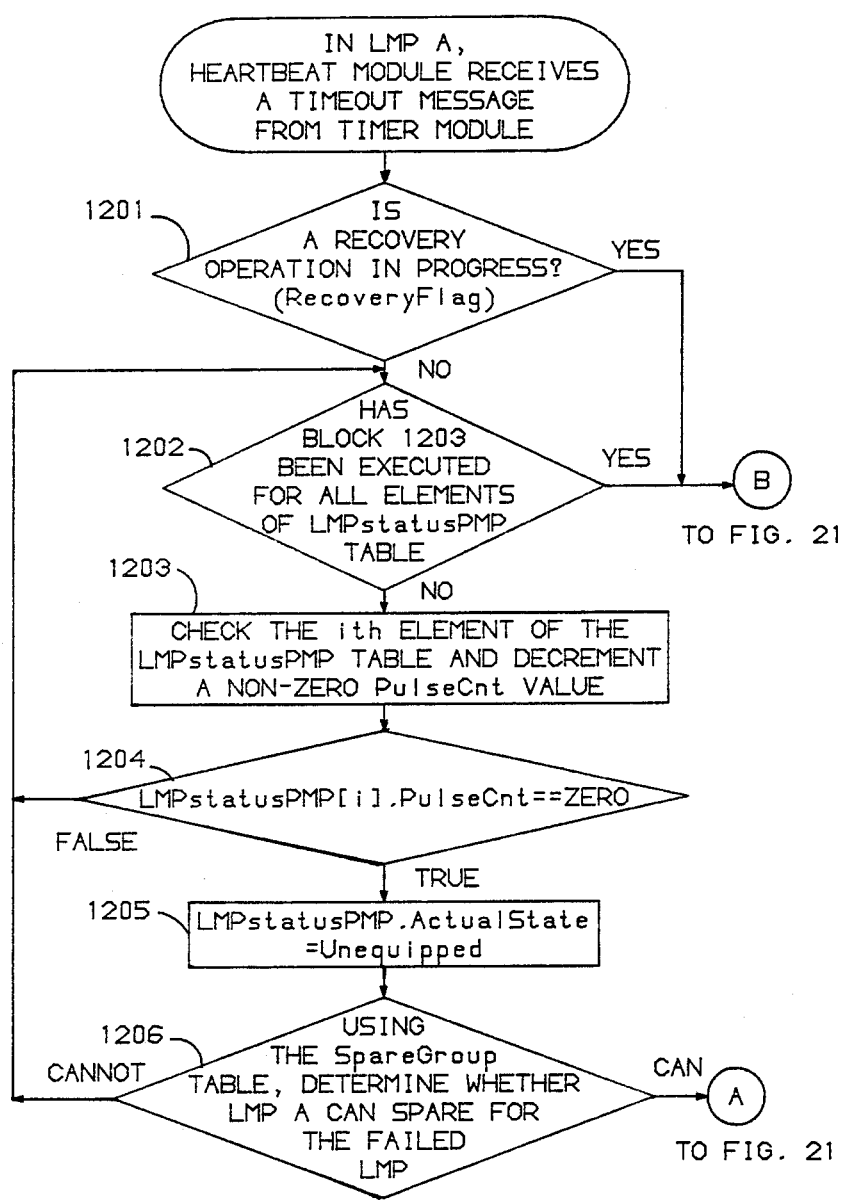
Figure 21:
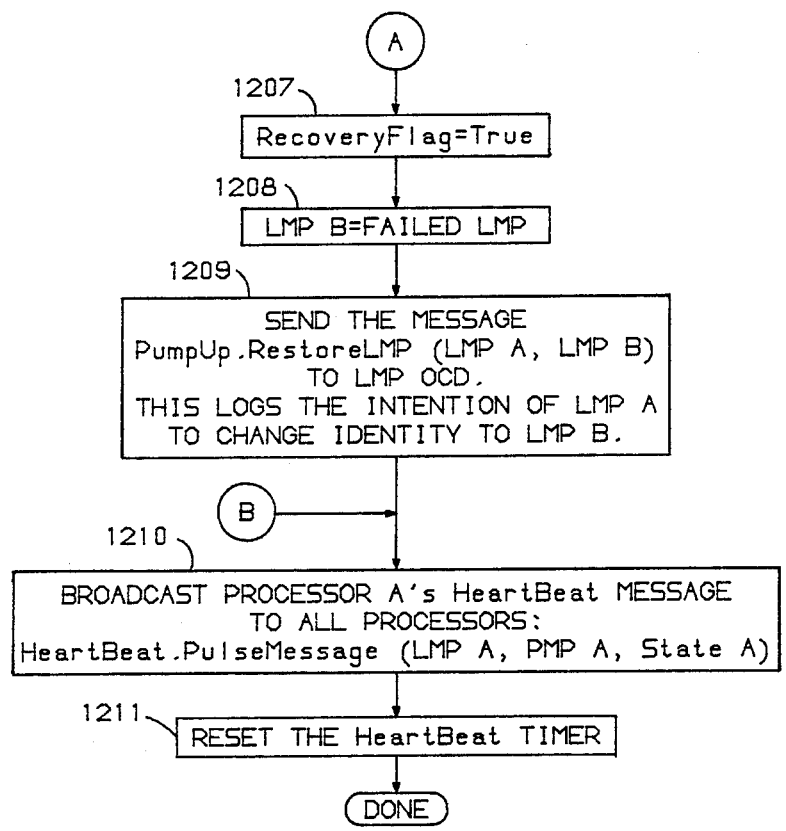

The flow chart of FIGS. 20 and 21 describes the response of the heartbeat module in processor LMP A to the receipt of a timeout message from the timer module. During block 1201, a determination is made based on the value of a Recovery Flag, of whether a recovery operation is in progress. If recovery is not in progress, execution proceeds to decision block 1202 to determine whether a subsequent decision block 1203 has been executed for all elements of the LMPstatusPMP table. Assuming a negative deterination, execution proceeds to block 1203 during which the ith element of the LMPstatusPMP table is checked and non-zero Pulse Count entries are decremented. Execution proceeds to decision block 1204, where a determination is made of whether the Pulse Count entry is in fact already equal to zero. If it is, execution proceeds to block 1205, where the actual state entry is changed to the unequipped state. Execution proceeds to decision block 1206 where a determination is made based on the SpareGroup table whether processor LMP A can spare for the failed processor. A negative determination in either of the decision blocks 1204 or 1206 results in a branch back to decision block 1202. If the determination made in block 1206 is positive, i.e., LMP A can spare for the failed processor, execution proceeds to blocks 1207 and 1208 (FIG. 21) where the Recovery Flag is set to True and LMP B is set equal to the logical identity of the failed LMP. Execution proceeds to block 1209 and the message PumpUp.RestoreLMP (LMP A, LMP B) is sent to the active database processor (LMP OCD). This logs the intention of LMP A to assume the identity of LMP B. Execution proceeds from block 1208 (as well as from decision blocks 1201 or 1202), to block 1210 during which processor LMP A's heartbeat message, HeartBeat.PulseMessage (LMP A, PMP A, State A), is broadcast to all processors. Execution proceeds from block 1210 to block 1211 and the heartbeat timer (implemented by the timer module) is reset.

Figure 22:
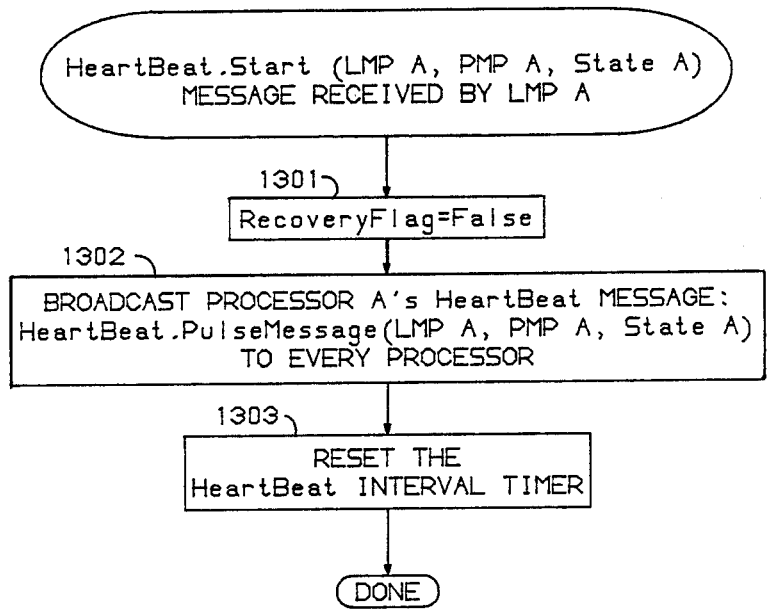

The flow chart of FIG. 22 describes the response of the heartbeat module in processor LMP A to the receipt of the HeartBeat.Start (LMP A, PMP A, State A) message typically from the cold start module also in processor LMP A. Execution begins with block 1301 where the Recovery Flag is set to False. Execution then proceeds to block 1302 during which processor LMP A's heartbeat message—HeartBeat.PulseMessage (LMP A, PMP A, State A) is broadcast to the other processors. Execution then proceeds to block 1303 and the heartbeat timer (implemented by the timer module) is reset.

Figure 23:
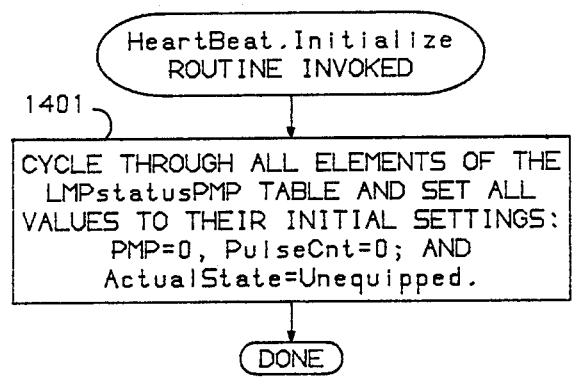

The flow chart of FIG. 23 describes the initialization of a heartbeat module. During block 1401, all the elements of the LMPstatusPMP table are cycled through and are set to the initial settings: PMP=0, Pulse Count=0, and Actual State=Unequipped.

Figure 24:
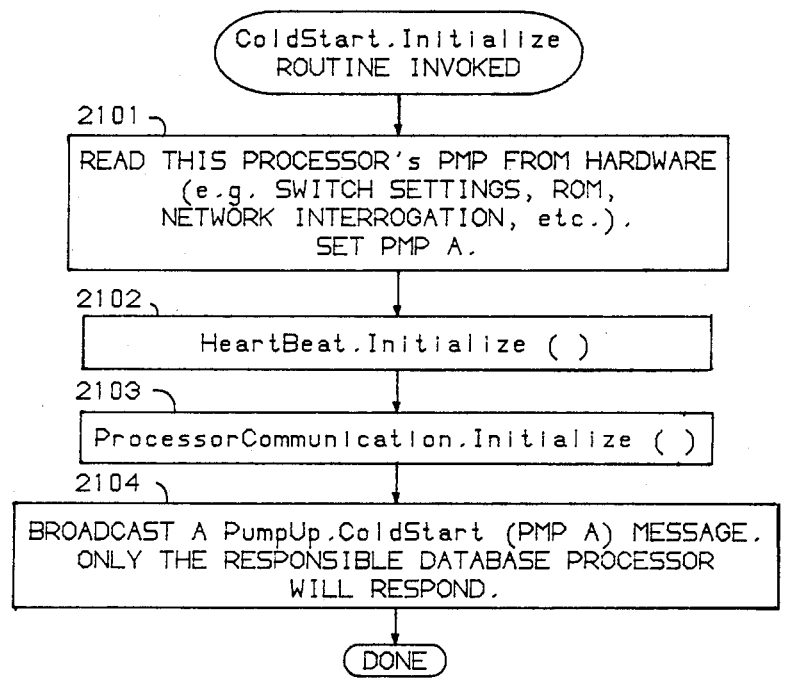

The flow chart of FIG. 24 describes the initialization of an unequipped processor. During block 2101, the processor's PMP is determined based, for example, on switch settings within the processor or on a ROM entry. PMP A is set equal to the determined PMP. Execution proceeds through blocks 2102 and 2103 where the heartbeat module initialization procedure and the processor communication module initialization procedure are respectively invoked. Then during block 2104, a PumpUp.ColdStart (PMP A) message is broadcast. By convention, only the active database processor will respond.

Figure 25:
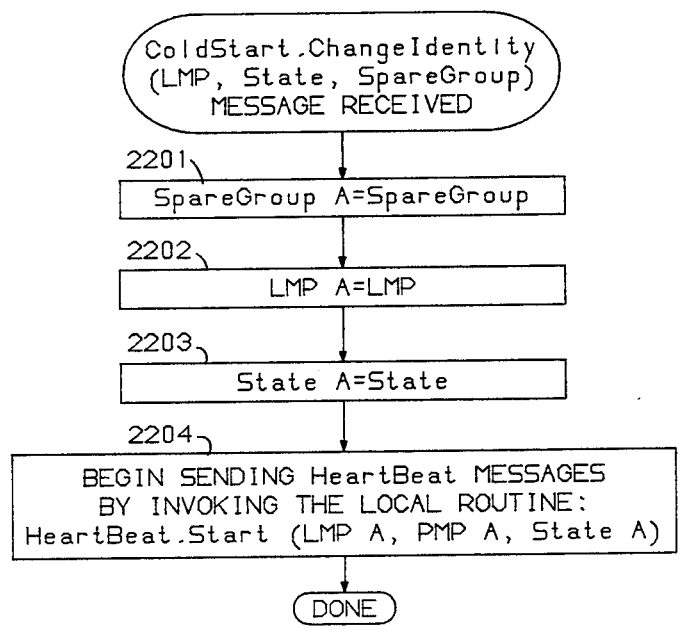

The flow chart of FIG. 25 describes the response of the cold start module to the receipt of a ColdStart.ChangeIdentity (LMP, State, SpareGroup) message by processor LMP A. During block 2201, the SpareGroup for LMP A is defined to be the SpareGroup received in the message. During block 2202, the logical identity of processor LMP A is changed to the LMP received in the message. During block 2203, the state of the processor is set to be the state received in the message. Execution then proceeds to block 2204 and the transmission of heartbeat messages is begun by invoking the local routine HeartBeat.Start (LMP A, PMP A, State A).

Figure 26:
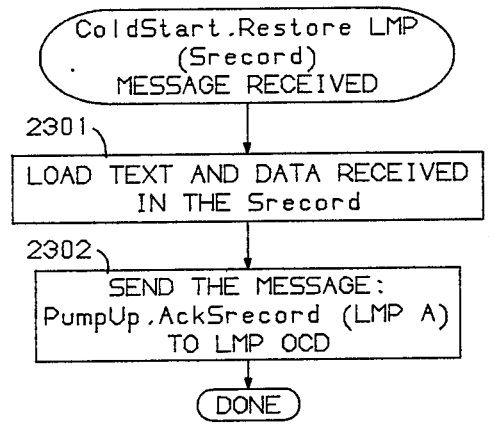

The flow chart of FIG. 26 describes the response of the cold start module to the receipt of a ColdStart.RestoreLMP (S-record) message. During block 2301, the program text and data included in the received S-record is loaded into the associated memory of the processor. Execution then proceeds to block 2302 and the message PumpUp.AckSrecord (LMP A) is transmitted to the database processor (LMP OCD) to acknowledge the receipt of the S-record.

Figure 27:
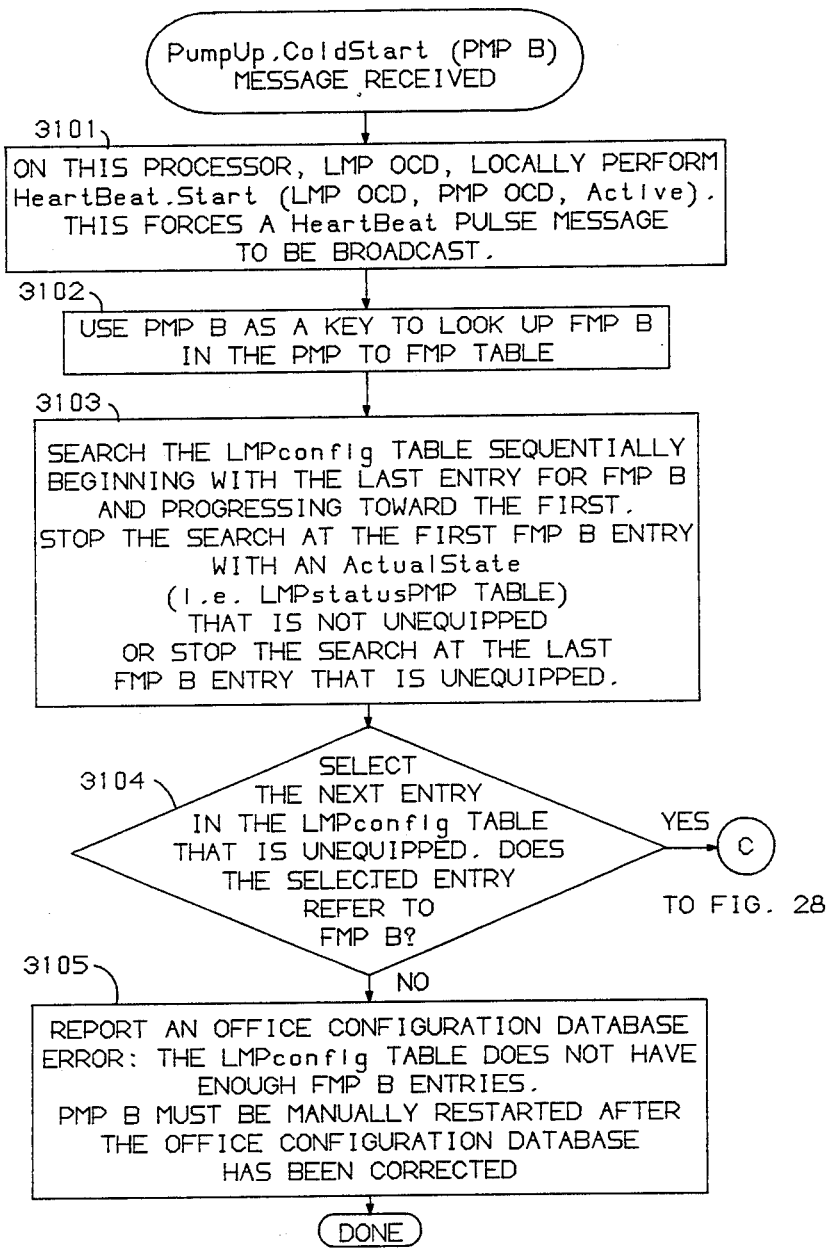
Figure 28:
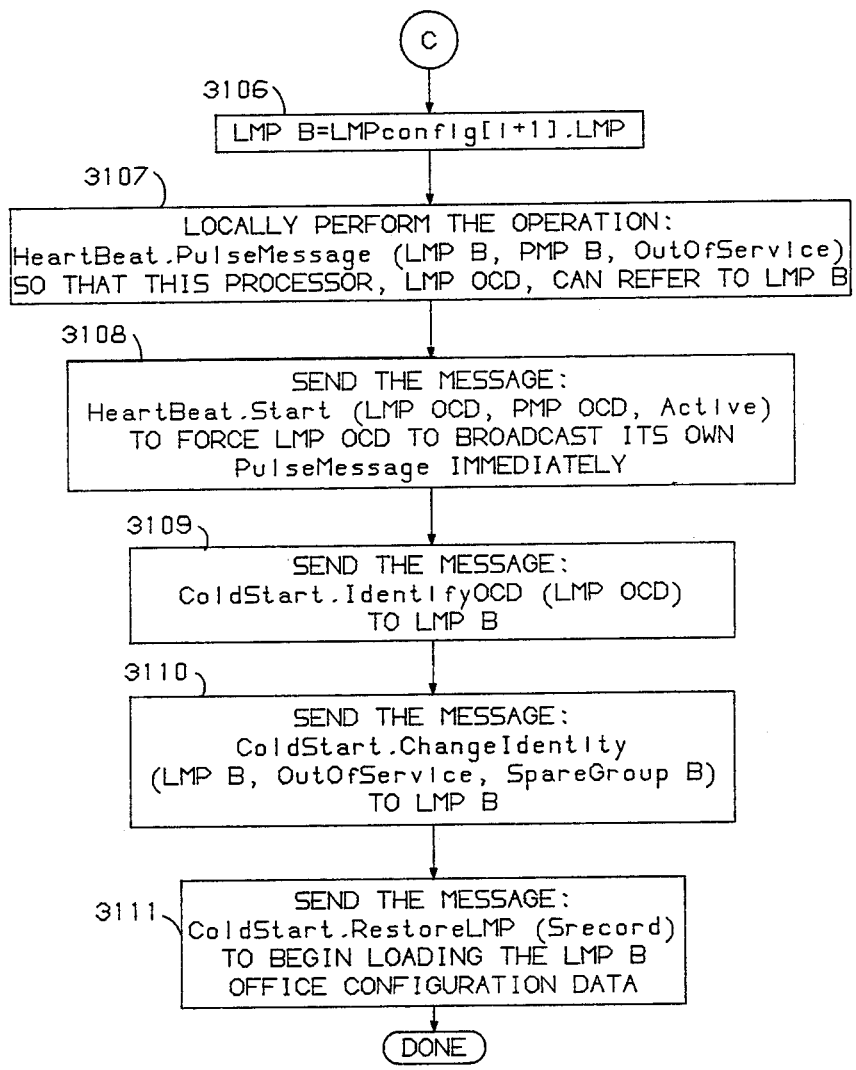

The flow chart of FIGS. 27 and 28 describes the response of the pump up module to the receipt of a PumpUp.ColdStart (PMP B) message. (Recall that only database processors have pump up modules.) The logical identity of the active database processor is referred to as LMP OCD. During block 3101, the HeartBeat.-Start (LMP OCD, PMP OCD, Active) message is sent to the heartbeat module. (This results in the heartbeat message being broadcast by the database processor.) During block 3102, the appropriate family of processors FMP B is determined from the PMPtoFMP table using PMP B as the key. Execution then proceeds to block 3103 and the LMPconfig table is searched sequentially beginning with the last entry for FMP B and progressing toward the first. The search is stopped at the first FMP B entry with an Actual State in the LMPstatusPMP table that is not unequipped. (The search is also stopped if the last FMP B entry is unequipped.) Execution then proceeds to decision block 3104 and the next entry in the LMPconfig table that is unequipped is selected and a determination is made of whether the selected entry also refers to FMP B. If not, execution proceeds to block 3105 and an office configuration database error is reported. The unequipped processor must be restarted after the database has been corrected. If a positive determination is made in decision block 3104, execution proceeds to block 3106 (FIG. 28) and the selected LMP B is assigned as the next entry in the LMPconfig table. Execution proceeds to block 3107 where the HeartBeat.PulseMessage (LMP B, PMP B, out-of-service) message is locally transmitted to the heartbeat module of the database processor so that the database processor can subsequently refer to LMP B. Execution proceeds to block 3108 where the HeartBeat.Start (LMP OCD, PMP OCD, Active) message is transmitted to the heartbeat module of the database processor so that it immediately broadcasts its own heartbeat messsage. Then during blocks 3109 and 3110, the messages ColdStart.Identify OCD (LMP OCD) and ColdStart.ChangeIdentity (LMP B, Out-Of-Service, SpareGroup B) are transmitted to processor LMP B. Finally, in block 3111 the message ColdStart.RestoreLMP (S-record) is transmitted to begin loading the processor LMP B with the required program text and data.

Figure 29:
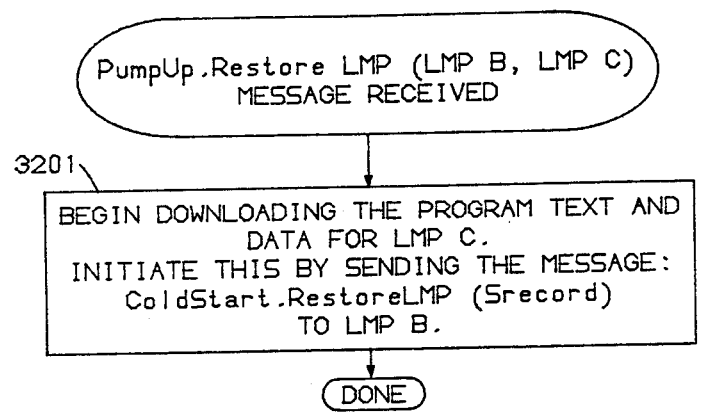

The flow chart of FIG. 29 describes the response of the pump up module of a database processor to the receipt of the PumpUp.RestoreLMP (LMP B, LMP C) message. The message indicates to the database processor that processor LMP B intends to assume the logical identity of processor LMP C. During block 3201, the downloading of the program text and data required by processor LMP C is begun by transmitting a ColdStart-.RestoreLMP (S-record) message to processor LMP B.

Figure 30:
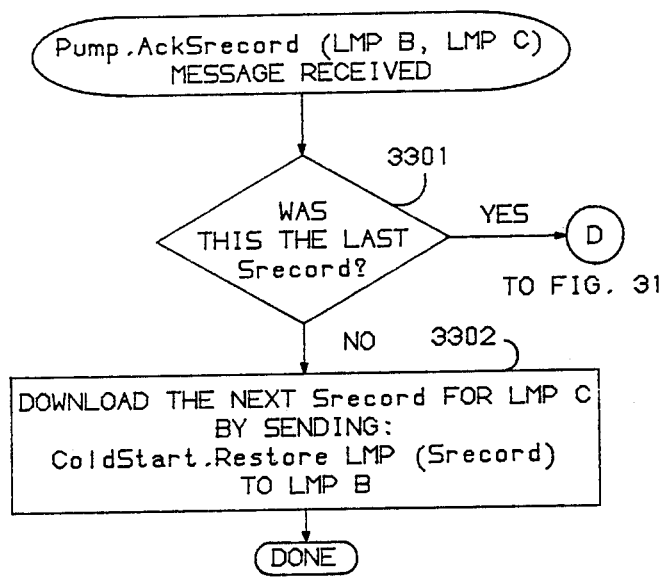
Figure 31:
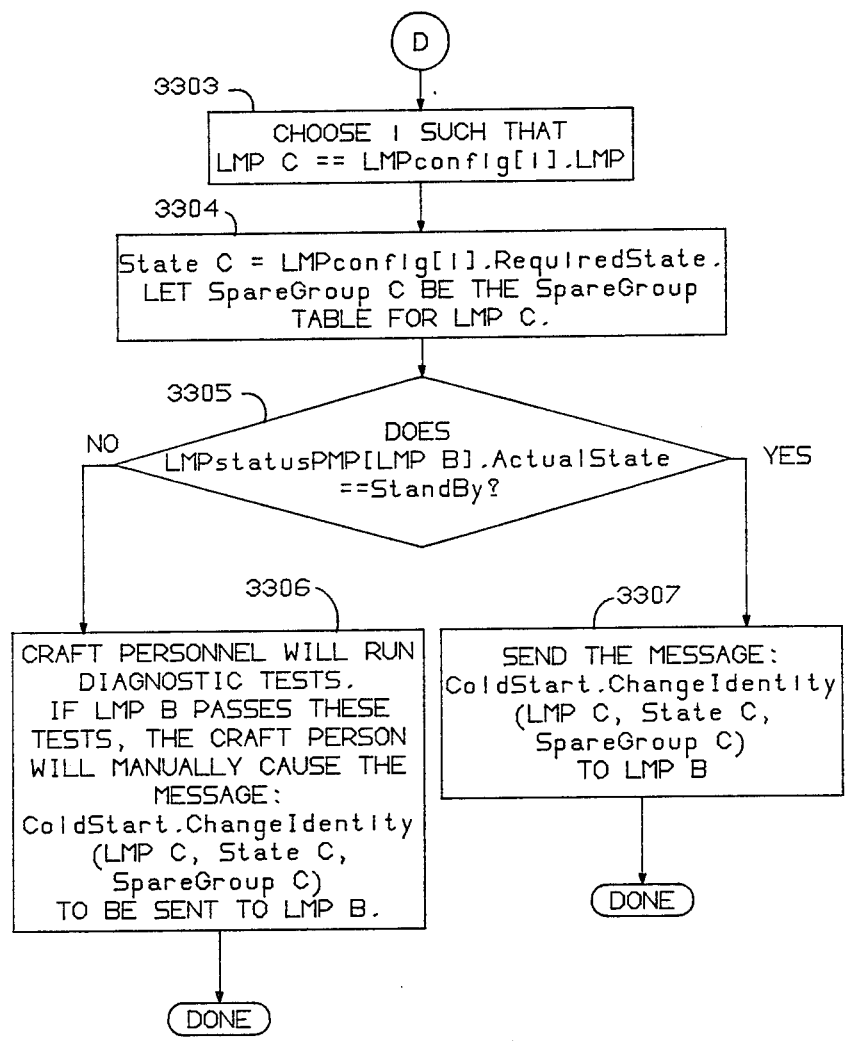

The flow chart of FIGS. 30 and 31 describes the response of the pump up module of a database processor to the receipt of the PumpUp.AckSrecord (LMP B, LMP C) acknowledgment message. Execution begins with block 3301 during which a determination is made of whether the S-record being acknowledged was the last S-record required. If not, execution proceeds to block 3302 during which the next S-record is requested by transmitting the message ColdStart.RestoreLMP (S-record) to processor LMP B. However, if it is determined in block 3301, that the last S-record has been received, execution proceeds to block 3303 (FIG. 31) where a value of i is selected such that LMP C is the ith entry in the LMPconfig table. This selection is made in order to determine the required state of the processor from the LMPconfig table. Execution then proceeds to block 3304 where the state of processor LMP C is assigned to be the required state for the ith entry of the LMPconfig table. Further, a SpareGroup table corresponding to LMP C is read from database 60. The ordering of entries in the LMPconfig table must correspond to the ordering of processor sparing. Execution proceeds to decision block 3305 where a determination is made of whether the actual state of processor LMP B as defined by the LMPstatusPMP table is the standby state. If it is, execution proceeds to block 3307 and the message ColdStart.ChangeIdentity (LMP C, State C, SpareGroup C) is transmitted to the cold start module of processor LMP B. If a negative determination is made in block 3305, execution proceeds to block 3306 during which diagnostic tests may be performed by a craftsperson. If the processor LMP B passes the tests, the craftsperson may manually cause the message ColdStart.ChangeIdentity (LMP C, State C, SpareGroup C) to be sent to the cold start module of processor LMP B.

Figure 32:
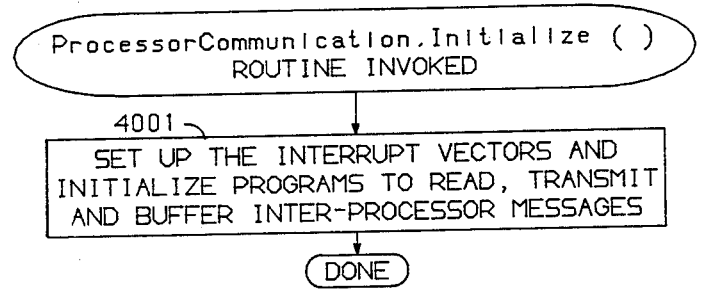

The flow chart of FIG. 32 describes the initialization of the processor communication module. During block 4001, interrupt vectors are set up and programs are initialized to read, transmit and buffer inter-processor messages. The interrupt vectors are stored in a memory table of subroutines to be preemptively performed whenever an external input/output event occurs.

Figure 33:
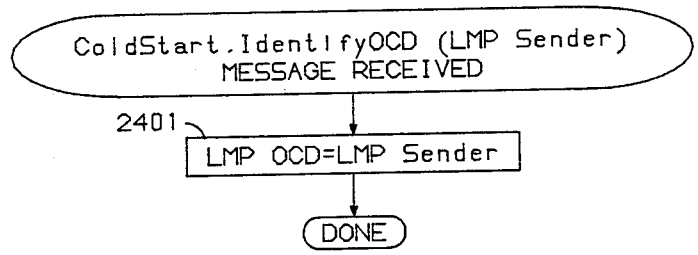

The flow chart of FIG. 33 describes the response of a cold start module in a processor being initially equipped for service to ColdStart.IdentifyOCD (LMP Sender) message from the pump up module in the active database processor. During block 2401, the LMP Sender identity received in the message is assigned as the identity of the active database processor (LMP OCD).

It is to be understood that the above-described fault recovery methods and distributed processing arrangements are merely illustrative of the principles of the present invention and that other methods and arrangements may be devised by those skilled in the art without departing from the spirit and scope of the invention. For example, in the fault recovery methods previously described, only processors in a standby state are allowed to replace failed active processors. In an alternative method, for example in an arrangement including no standby processors, one active processor having a given logical identity defining the performance of functions in the arrangement, can in addition assume the logical identity and perform the functions of a failed active processor. In such case, the operational processor broadcasts separate heartbeat messages for each logical identity and distinct entries are stored in each of the LMPstatusPMP tables of the other processors in the arrangement.

What is claimed is:
1. In an arrangement comprising a plurality of processors interconnected for message communication and each having a logical identity defining functions performed by that processor with respect to said arrangement, a fault recovery method comprising
  each of said processors repeatedly broadcasting heartbeat messages to others of said processors, which heartbeat messages each define the logical identity of the processor broadcasting the heartbeat message, at least one of said processors maintaining an associated status table defining the logical identities of others of said processors based on heartbeat messages received therefrom and said at least one of said processors, upon failing to receive heartbeat messages defining one of said logical identities defined in said status table, initiating performance of the functions defined by said one of said logical identities.

2. A method in accordance with claim 1 wherein said at least one of said processors has an associated sparing table defining logical identities each defining functions that said at least one of said processors can perform, said method further comprising said at least one of said processors, upon failing to receive heartbeat messages defining said one of said logical identities and prior to said initiating step, reading said sparing table, and said at least one of said processors determining based on said read sparing table, whether said at least one of said processors can perform the functions defined by said one of said logical identities, wherein said initiating step is performed only upon a determination that said at least one of said processors can perform the functions defined by said one of said logical identities.

3. A method in accordance with claim 2 wherein said arrangement further comprises a database processor interconnected for message communication with said plurality of processors, wherein said initiating step further comprises said at least one of said processors transmitting a download request message to said database processor, and wherein said method further comprises said database processor responding to said download request message by downloading information needed by said at least one of said processors to perform the functions defined by said one of said logical identities.

4. A method in accordance with claim 3 wherein said initiating step further comprises said at least one of said processors repeatedly broadcasting heartbeat messages to others of said processors, which heartbeat messages each define said one of said logical identities.

5. A method in accordance with claim 1 wherein said arrangement further comprises a database processor interconnected for message communication with said plurality of processors, wherein said initiating step further comprises said at least one of said processors transmitting a download request message to said database processor, and wherein said method further comprises said database processor responding to said download request message by downloading information needed by said at least one of said processors to perform the functions defined by said one of said logical identities.

6. A method in accordance with claim 1 wherein said initiating step further comprises said at least one of said processors repeatedly broadcasting heartbeat messages to others of said processors, which heartbeat messages each define said one of said logical identities.

7. A method in accordance with claim 1 wherein said at least one of said processors and one of said processors having said one of said logical identities, operate in a duplex standby mode of operation.

8. A method in accordance with claim 1 wherein each of said plurality of processors can have multiple logical identities, wherein said at least one of said processors has a given logical identity prior to said initiating step, and wherein said initiating step further comprises said at least one of said processors repeatedly broadcasting heartbeat messages to others of said processors, which heartbeat messages each define said given logical identity, and said at least one of said processors repeatedly broadcasting heartbeat messages to others of said processors, which heartbeat messages each define said one of said logical identities.

9. In an arrangement comprising a plurality of processors interconnected for message communication and each having a physical identity with respect to said arrangement and a logical identity defining functions performed by that processor with respect to said arrangement, a fault recovery method comprising each of said processors repeatedly broadcasting heartbeat messages to others of said processors, which heartbeat messages each define the physical identity and the logical identity of the processor broadcasting the heartbeat message, each of said processors maintaining an associated status table defining the physical and logical identities of others of said processors based on heartbeat messages received therefrom, and a given one of said processors, upon failing to receive heartbeat messages defining one of the logical identities defined in the status table associated with said given processor, initiating performance of the functions defined by said one of said logical identities.

10. A method in accordance with claim 9 wherein said initiating step further comprises said given processor repeatedly broadcasting heartbeat messages to others of said processors, which heartbeat messages each define the physical identity of said given processor and said one of said logical identities.

11. A method in accordance with claim 10 further comprising ones of said processors responding to said heartbeat messages defining the physical identity of said given processor and said one of said logical identities, by updating their associated status tables to define said given processor as having said one of said logical identities.

12. In an arrangement comprising a resource pool of processors and at least one other processor interconnected for message communication, a method for use by said other processor for selecting a processor from said resource pool comprising each of said resource pool of processors repeatedly transmitting heartbeat messages to said other processor, which heartbeat messages each define a present processor state of the processor transmitting the heartbeat message, said other processor maintaining based on heartbeat messages received from said resource pool of processors, a status table defining a present processor state of each of said resource pool of processors and said other processor selecting a processor from said resource pool based on the processor state defined by said status table for said selected processor.

13. A method in accordance with claim 12 wherein said selecting step comprises said other processor selecting a processor from said resource pool that is defined as being in an active processor state by said status table.

14. A method in accordance with claim 12 further comprising the following steps prior to said selecting step:

one of said resource pool of processors terminating the transmission of heartbeat messages and said other processor, upon failing to receive heartbeat messages from said one of said resource pool of processors, changing said status table to define the present state of said one of said resource pool of processors as being out-of-service.

15. A method in accordance with claim 14 wherein said selecting step comprises said other processor selecting a processor from said resource pool that is defined as being in an active processor state by said status table.

16. In an arrangement comprising a plurality of processors interconnected for message communication and including N active processors and at least one spare processor, N being a positive integer greater than one, each of said plurality of processors having a logical identity defining functions performed by that processor with respect to said arrangement, a method of recovering from a failure of any one of said N active processors comprising each of said plurality of processors repeatedly broadcasting heartbeat messages to others of said plurality of processors, each of said plurality of processors monitoring the receipt of heartbeat messages from others of said plurality of processors, said one processor terminating its broadcasting of heartbeat messages, and said spare processor, upon failing to receive heartbeat messages from said one processor, initiating performance of the functions defined by the logical identity of said one processor.

17. A method in accordance with claim 16 wherein further comprising a database processor interconnected for message communication with said plurality of processors, and wherein said at least one of said processors further comprises means for transmitting a download request message to said database processor, and wherein said database processor comprises means responsive to said download request message for downloading information needed by said at least one of said processors to perform the functions defined by said one of said logical identities.

18. In an arrangement comprising a plurality of processors interconnected for message communication and including N active processors, at least one primary square processor, and at least one secondary spare processor, N being a positive integer greater than one, each of said plurality of processors having a logical identity defining functions performed by that processor with respect to said arrangement, a method of recovering from a failure of any one of said N active processors comprising each of said plurality of processors repeatedly broadcasting heartbeat messages to others of said plurality of processors, each of said plurality processors monitoring the receipt of hearbeat messages from others of said plurality of processors, said one processor terminating its broadcasting of heartbeat messages, said primary spare processor, upon failing to receive hearbeat messages from said one processor, initiating performance of the functions defined by the logical identity of said one processor, and upon said primary spare processor initiating performance of the functions defined by the logical identity of said one processor, said secondary spare processor initiating performance of the functions defined by the logical identity of said primary spare processor.

19. In an arrangement comprising a plurality of processors interconnected for message communication and including at least one active processor, at least one primary spare processor, and at least one secondary spare processor, each of said plurality of processors having a logical identity defining functions performed by that processor with respect to said arrangement, a method of recovering from a failure of said one active processor comprising each of said plurality of processors repeatedly broadcasting heartbeat messages to others of said plurality of processors, which heartbeat messages each define the logical identity of the processor broadcasting the heartbeat message, each of said plurality of processors monitoring the receipt of heartbeat messages from others of said plurality of processors, said one active processor terminating its broadcasting of heartbeat messages, upon failing to receive heartbeat messages from said one active processor, said primary spare processor terminating its broadcasting of heartbeat messages defining the logical identity of said primary spare processor and initiating performance of the functions defined by the logical identity of said one active processor, said secondary spare processor, upon failing to receive heartbeat messages defining the logical identity of said primary spare processor, initiating performance of the functions defined by the logical identity of said primary spare processor.

20. In an arrangement comprising a plurality of processors interconnected for message communication and each having a logical identity defining the functions performed by that processor with respect to said arrangement, a fault recovery method comprising each of said processors repeatedly broadcasting heartbeat messages to others of said processors, said heartbeat messages each defining the logical identity of the processor broadcasting the heartbeat message, any one of said processors terminating the broadcasting of its heartbeat messages and another of said processors, upon failing to receive heartbeat messages from said any one of said processors, initiating performance of the functions defined by the logical identity of said any one of said processors.

21. A method in accordance with claim 20 wherein each of said processors has an associated sparing table defining logical identities each defining functions that said each processor can perform, said method further comprising said another of said processors, upon failing to receive heartbeat messages from said any one of said processors and prior to said initiating step, reading the sparing table associated with said another of said processors, and said another of said processors determining based on said read sparing table, whether said another of said processors can assume said logical identity of said any one of said processors, wherein said initiating step is performed only upon a determination that said another of said processors can perform the functions defined by said logical identity of said any one of said processors.

22. A method in accordance with claim 20 wherein said initiating step further comprises said another of said processors repeatedly broadcasting heartbeat messages to others of said processors, which heartbeat messages each define said logical identity of said any one of said processors.

23. A distributed processing arrangement comprising a plurality of processors interconnected for message communication and each having a logical identity defining functions performed by that processor with respect to said arrangement, wherein each of said processors comprises means for repeatedly broadcasting heartbeat messages to others of said processors, which heartbeat messages each define the logical identity of said each processor, and wherein at least one of said processors further comprises means for maintaining a status table defining the logical identities of others of said processors based on heartbeat messages received therefrom, and means responsive to a failure to receive heartbeat messages defining one of said logical identities defined in said status table, for initiating performance of the functions defined by said one of said logical identities.

24. An arrangement in accordance with claim 23 wherein said at least one of said processors further comprises means for storing a sparing table defining logical identities each defining functions that said at least one of said processors can perform, and means for reading said sparing table, and means for determining based on said read sparing table, whether said at least one of said processors can perform the functions defined by said one of said logical identities, and wherein said at least one of said processors initiates performance of the functions defined by said one of said logical identities only upon a determination by said determining means that said at least one of said processors can perform the functions defined by said one of said logical identities.

25. An arrangement in accordance with claim 24 further comprising a database processor interconnected for message communication with said plurality of processors, and wherein said at least one of said processors further comprises means for transmitting a download request message to said database processor, and wherein said database processor comprises means responsive to said download request message for downloading information needed by said at least one of said processors to perform the functions defined by said one of said logical identities.

26. An arrangement in accordance with claim 25 wherein the broadcasting means of said at least one of said processor initiates, upon said at least one of said processors initiating performance of the functions defined by said one of said logical identities, the repeated broadcasting of heartbeat messages to others of said processors, which heartbeat messages each define said one of said logical identities.

27. An arrangement in accordance with claim 23 further comprising a database processor interconnected for message communication with said plurality of processors, and wherein said at least one of said processors further comprises means for transmitting a download request message to said database processor, and wherein said database processor comprises means responsive to said download request message for downloading information needed by said at least one of said processors to perform the functions defined by said one of said logical identities.

28. An arrangement in accordance with claim 23 wherein the broadcasting means of said at least one of said processors initiates, upon said at least one of said processors initiating performance of the functions defined by said one of said logical identities, the repeated broadcasting of heartbeat messages to others of said processors, which heartbeat messages each define said one of said logical identities.

29. An arrangement in accordance with claim 23 wherein each of said plurality of processors has a physical identity with respect to said arrangement, wherein each of said plurality of processors is in one of a plurality of processor states, and wherein the heartbeat messages broadcast by the broadcasting means of each of said plurality of processors, each define the logical identity, physical identity, and present processor state of the processor broadcasting the heartbeat message.

30. An arrangement in accordance with claim 23 wherein said arrangement is included in a distributed control switching system.

31. A distributed processing arrangement comprising a plurality of processors interconnected for message communication and each having a physical identity with respect to said arrangement and a logical identity defining functions performed by that processor with respect to said arrangement, wherein each of said processors comprises means for repeatedly broadcasting heartbeat messages to others of said processors, which heartbeat messages each define the physical identity and the logical identity of the processor broadcasting the heartbeat message, and means for maintaining an associated status table defining the physical and logical identities of others of said processors based on heartbeat messages received therefrom, and wherein a given one of said processors further comprises means responsive to a failure to receive heartbeat messages defining one of the logical identities defined in the status table associated with said given processor, for initiating performance of the functions defined by said one of said logical identities.

32. An arrangement in accordance with claim 31 wherein the broadcasting means of said given processor initiates, upon said given processor initiating performance of the functions defined by said one of said logical identities, the repeated broadcasting of heartbeat messages to others of said processors, which heartbeat messages each define the physical identity of said given processor and said one of said logical identities.

33. An arrangement in accordance with claim 32 wherein the maintaining means of each of said processors is responsive to the receipt of said heartbeat messages defining the physical identity of said given processor and said one of said logical identities, for updating the status table associated with said each processor to define said given processor as having said one of said logical identities.

34. A distributed processing arrangement comprising a resource pool of processors and at least one other processor interconnected for message communication,
 each of said resource pool of processors comprising
  means for repeatedly transmitting heartbeat messages to said other processor, which heartbeat messages each define a present processor state of the processor transmitting the heartbeat message, and
 said other processor comprising means for maintaining based on heartbeat messages received from said resource pool of processors, a status table defining a present processor state of each of said resource pool of processors, and means for selecting a processor from said resource pool based on the processor state defined by said status table for the selected processor.

35. A distributed processing arrangement comprising a plurality of processors interconnected for message communication and each having a logical identity defining functions performed by that processor with respect to said arrangement, wherein each of said processors comprises
  means for repeatedly broadcasting heartbeat messages to others of said processors, said heartbeat messages each defining the logical identity of the processor broadcasting the heartbeat message,
  means responsive to a termination in receiving heartbeat messages from any one of said processors, for initiating performance of the functions defined by the logical identity of said any one of said processors.

36. An arrangement in accordance with claim 35 wherein said each processor further comprises
  means for storing an associated sparing table defining logical identities each defining functions that said each processor can perform,
  means responsive to said termination, for reading the sparing table associated with said each processor, and
  means for determining based on said read sparing table, whether said each processor can perform the functions defined by said logical identity of said any one of said processors,
  wherein said initiating means is responsive to said determining means for initiating performance of the functions defined by said logical identity of said any one of said processors only when said determining means determines that each each processor can perform the functions defined by said logical identity of said any one of said processors.

37. An arrangement in accordance with claim 35 wherein said initiating means further comprises
  means for repeatedly broadcasting heartbeat messages to others of said processors, which heartbeat messages each define said logical identity of said any one of said processors.

* * * * *